(12) United States Patent
Lewis

(10) Patent No.: US 7,593,919 B2
(45) Date of Patent: Sep. 22, 2009

(54) INTERNET WEB SHIELD

(75) Inventor: David Allan Lewis, Round Lake, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 505 days.

(21) Appl. No.: 11/051,965

(22) Filed: Feb. 4, 2005

(65) Prior Publication Data

US 2006/0179031 A1 Aug. 10, 2006

(51) Int. Cl.
*G06F 7/00* (2006.01)
*G06F 17/30* (2006.01)

(52) U.S. Cl. ............. 707/1; 707/9; 707/10; 709/225; 715/741

(58) Field of Classification Search .............. 707/1–10, 707/100–104.1, 200–206; 709/225, 206; 713/182–185, 170; 715/741–743
See application file for complete search history.

(56) References Cited

U.S. PATENT DOCUMENTS

| | | | | |
|---|---|---|---|---|
| 6,901,511 | B1 * | 5/2005 | Otsuka | 713/164 |
| 2003/0226059 | A1 * | 12/2003 | Braun | 714/20 |
| 2004/0117383 | A1 * | 6/2004 | Lee et al. | 707/100 |
| 2004/1023053 | * | 11/2004 | Fung et al. | 705/64 |

OTHER PUBLICATIONS

RFC 2822 (2001).*
Bingyang Zhou, An integrated Web security system, Sep. 1-5, 2003, IEEE, 204-208.*
Alfred C. Weaver et al., Enforcing Distributed Data Security via Web Services, 2004, IEEE, 397-402.*
Hayes,, Policy-based authentication and authorization: secure access to the network infrastructure, Dec. 11-15, 2000, IEEE, 328-333.*

* cited by examiner

*Primary Examiner*—Jean B Fleurantin
(74) *Attorney, Agent, or Firm*—Toler Law Group

(57) ABSTRACT

A computer-readable device is provided to a user. The device has unique and unalterable identification data set by its manufacturer, and application data stored therein by a party other than the manufacturer. The identification data and the application data from the device are collected based on an attempt by the user to access a first Web resource. The device is authorized or unauthorized based on the identification data and the application data. If the device is unauthorized, access to the first Web resource is denied and the user is forwarded to a second Web resource. If the device is authorized, access is authorized or unauthorized based on a rule record associated with the device. If access is authorized, the user is enabled access to the first Web resource. If access is unauthorized, access to the first Web resource is denied and the user is forwarded to a third Web resource.

17 Claims, 2 Drawing Sheets

INTERNET WEB SHIELD

FIELD OF THE DISCLOSURE

The present disclosure relates to methods and systems for limiting access to a Web site.

BACKGROUND

A company may need to allow other companies to access its Web site via the Internet. For example, a telecommunications company's Web site may allow other companies to request moves, adds or changes and/or make service requests into the telecommunication company's computer system. A challenge is to ensure that unauthorized parties do not gain access to the Web site. A shortcoming of making the Web site password protected is that hackers can steal passwords from unsuspecting users. Also, some companies may forget to notify vendors that an employee has been dismissed and that his/her password should be revoked.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Disclosed herein are embodiments of an Internet Web shield that allows only individuals and/or computers of its choosing to load and/or access an Internet Web site. In one embodiment, the Web shield blocks unauthorized individuals and/or computers from reaching a Web site having a login page or an alternative login user interface in which users enter a password to gain access to another computer. Authorized individuals who type a Web address are given access to the login page. Unauthorized individuals who type the same Web address are directed to another Web page, such as an information page. Upon receiving and viewing the information page, unauthorized users may conclude that the Web site is of no interest to attempt to hack. The system is usable in both mobile computing and fixed location computing applications.

Figure 1:
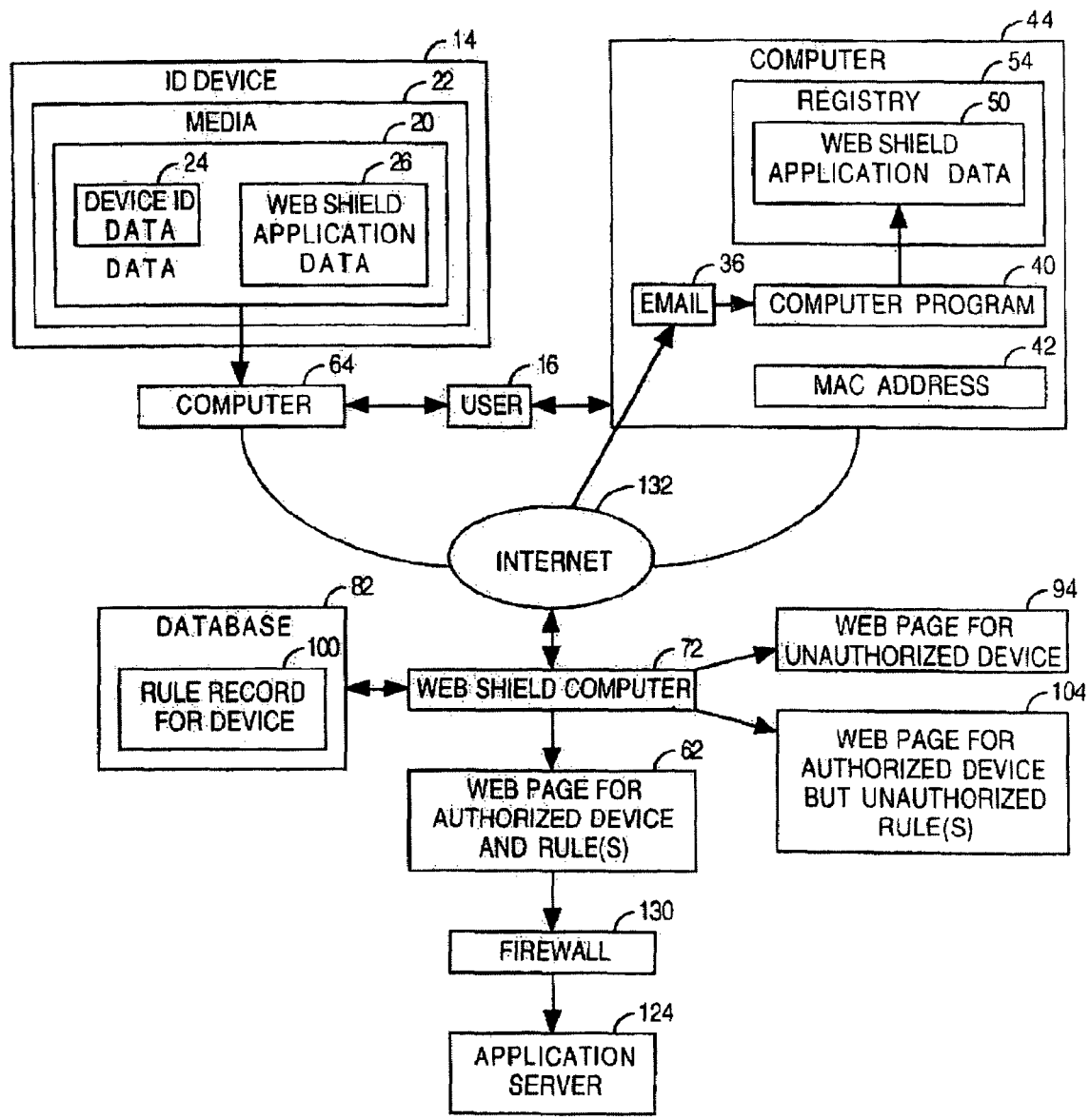
FIG. 1 is a block diagram of an embodiment of an Internet Web shield system.
Figure 2:
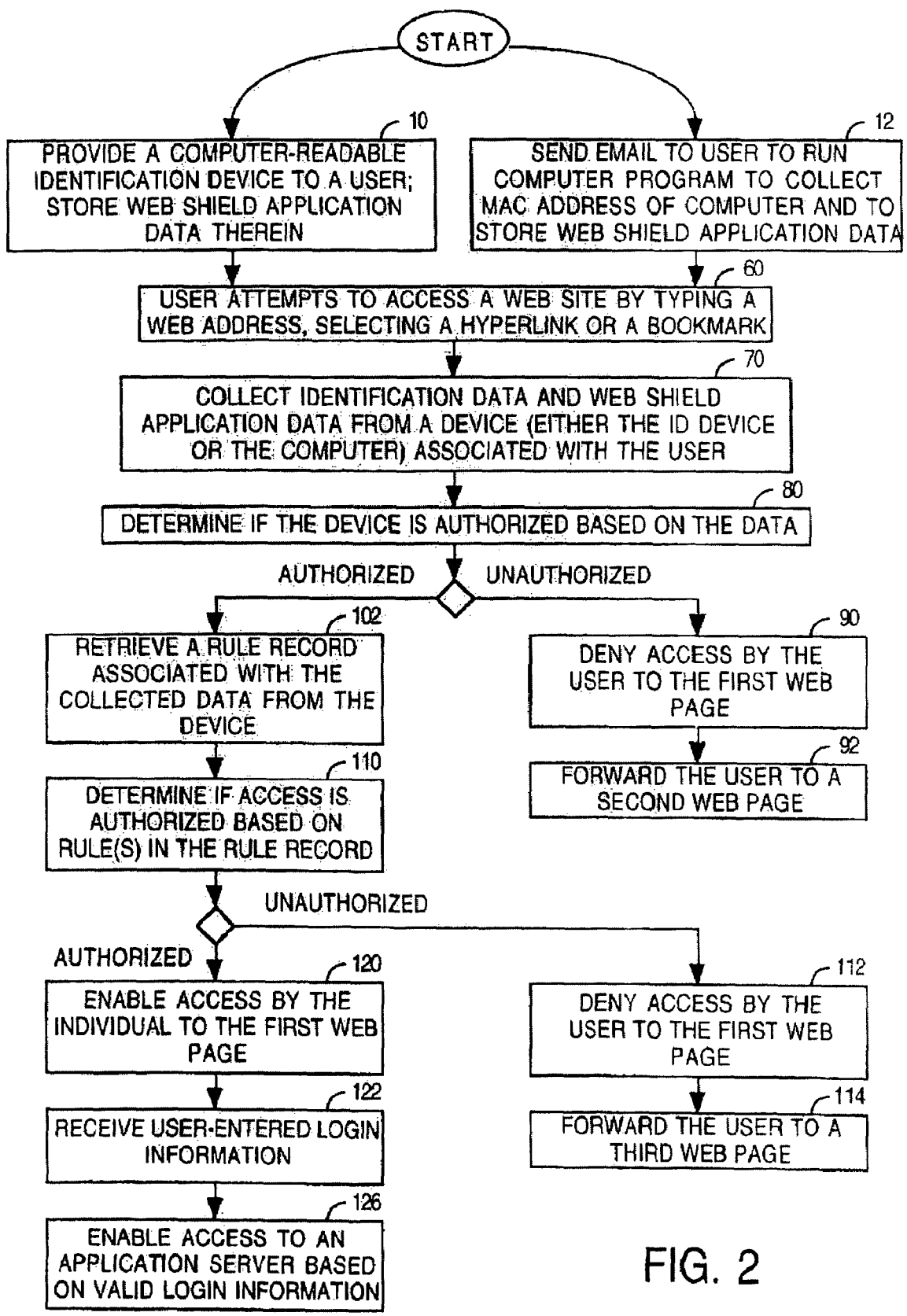
FIG. 2 is a flow chart of an embodiment of a method of limiting access to a Web site using the Internet Web shield system.

Embodiments are described with reference to FIG. 1, which is a block diagram of an embodiment of a Web shield system and FIG. 2, which is a flow chart of an embodiment of a method of limiting access to a Web site using the Web shield system. Acts in the method are described for one user, although typically the Web shield system is used to selectively enable and deny access to a Web site for each of a plurality of different users.

The method comprises at least one of the two acts indicated by blocks 10 and 12. Block 10 indicates an act of providing an identification device 14 to a user 16. In one embodiment, the identification device 14 comprises a contact-less electronic tag such as a radio frequency identification (RFID) tag. In another embodiment, the identification device 14 comprises a contact electronic tag such as an iButton® device from Maxim Integrated Products, Inc. The iButton® device comprises a computer chip in a stainless steel can. As specified by Maxim Integrated Products, Inc., the iButton® device may be attached to a personal item such as a key fob, a watch or a ring.

Regardless of its form, the identification device 14 stores data 20 in media 22, examples of which include at least one computer memory, at least one computer-readable magnetic medium, at least one computer-readable optical medium, or any combination thereof. The data 20 comprises device identification data 24 and Web shield application data 26. The device identification data 24 is a unique identifier of the identification device 14. The device identification data 24 may be stored in the media 22 by a manufacturer of the identification device 14. For example, the identification data 24 may comprise a public key of the identification device 14. In one embodiment, the identification data 24, once written by the manufacturer, is not rewritable by others (e.g. others cannot write different identification data into the identification device 14). An iButton® device, for example, has a unique and unalterable address that is set by its manufacturer.

The Web shield application data 26 is stored in the media 22 by a computer running a Web shield application program. In one embodiment, the Web shield application data 26 comprises encrypted data. The Web shield application data 26 may be stored by a party connected with providing security for the particular Web site, and not by the manufacturer of the identification device 14. Further, the identification data 24 may be set by the manufacturer of the identification device 14 and not by a party connected with providing security for the particular Web site.

The data 20, including the identification data 24 and the Web shield application data 26, is externally readable by a computer 64 being used by the user 16, the computer having a device reader. For example, a 1-Wire® interface from Maxim Integrated Products, Inc. can be connected to a computer so that the computer can read iButton® devices. As another example, an RFID tag reader can be connected to a computer so that the computer can read RFID tags.

The identification device 14 may be provided to the user 16 by a human resources (HR) department of an employer of the user 16. The identification device 14 may be attached to or integrated with a card or a personal item such as a key fob, for example. The user 16 returns the identification device 14 back to the HR department if he/she retires, is terminated, or otherwise leaves employment by his/her employer.

Block 12 indicates an act of sending an email 36 to the user 16. The email 36 requests that the user 16 run a computer program 40 that will collect a media access control (MAC) address 42 of a computer 44 that the user 16 is to use to access one or more shielded Web sites. The email 36 has a unique identifier and can be used only once. This thwarts potential attempts to use the same email 36 to register multiple computers. The computer program 40 also acts to store Web shield application data 50 in the computer 44. In one embodiment, the Web shield application data 50 comprises encrypted data stored in a registry 54 of the computer 44. The computer program 40 need only be run once, or may be subsequently run after a long period of time (e.g. ten years), to keep the computer 44 usable by the Web shield system.

After at least one of the acts indicated by block 10 and 12 are performed, the user 16 and/or the computer 44 is registered to access one or more shielded Web sites.

As indicated by block 60, the user 16 attempts to access a first Web page 62 using a computer. Although the first Web page 62 may comprise any Web page, of particular interest are embodiments wherein the first Web page 62 provides a login user interface. In these embodiments, the Web shield acts prior to a user logging into a Web site.

The computer may comprise the computer 44 or another computer 64. For purposes of illustration and example, the computer 64 is considered not to be registered in accordance with block 12. The user 16 may attempt to access the first Web page 62 by typing a Web address (e.g. a uniform resource locator). Alternatively, the user 16 may attempt to access the first Web page 62 by clicking on or otherwise selecting a hyperlink to the first Web page 62, or clicking on or otherwise selecting a bookmark to the first Web page 62.

As indicated by block 70, in response to the attempt, a Web shield computer 72 automatically collects data from a device associated with the user 16. The device may comprise the identification device 14 and/or the computer 44. The collected data comprises a unique device identifier and Web shield application data. In the case of the identification device 14, the Web shield computer 72 automatically collects the identification data 24 and the Web shield application data 26 therefrom. The computer 64 acts to read the identification data 24 and the Web shield application data 26 from the identification device 14 and to communicate the same to the Web shield computer 72. In the case of the computer 44, the Web shield computer 72 automatically collects the MAC address 42 and the Web shield application data 50 from the registry 54.

As indicated by block 80, the Web shield computer 72 determines if the device is authorized based on the collected data. The Web shield computer 72 may access a database 82 to determine if the combination of device identifier and Web shield application data is an authorized pair. For example, the Web shield computer 72 may determine that the device is authorized based on the identification data 24 (e.g. its public security key) and the Web shield application data 26 from the identification device 14, or based on the MAC address 42 and the Web shield application data 50 from the computer 44. Examples of cases in which the device is unauthorized include, but are not limited to, if the device is unrecognized by the Web shield computer 72, if the device is recognized by the Web shield computer 72 but Web shield application data is not stored in the device, and if the device is recognized and Web shield application data is stored in the device but the identification data is associated with a terminated user.

If the device is unauthorized based on the collected data, the Web shield computer 72 denies and inhibits access to the first Web page 62 as indicated by block 90. Optionally, as indicated by block 92, the Web shield computer 72 forwards an unauthorized user to a second Web page 94. The second Web page 94 may comprise an information page. In the case of the first Web page 62 providing a login user interface, the second Web page 94 may be absent of any login user interface, and further may provide no indication that the login user interface is accessible by someone who types the Web address used in block 60.

If the device is authorized based on the collected data, the Web shield computer 72 retrieves a rule record 100 associated with the collected data, as indicated by block 102. The rule record 100 may be stored in the database 82 or another database. The rule record 100 links the device to one or more associated rules for device access. The one or more rules limit access to the first Web page 62 by an authorized device. The database 82 may comprise different rule records for different devices so that each device has its own set of rules for accessing the first Web page 62.

Examples of rules stored by the rule record 100 include, but are not limited to, a valid number of times that the device is allowed to access the first Web page 62, a maximum number of times the device is allowed to access the first Web page 62 during particular times-of-day (e.g. a number of after-normal-hours requests or a number of emergency access requests), when use of the device is to expire (e.g. an expiration date), which users are allowed to use the device, a total number of times access is allowed using the device, a count of the total number of accesses, a maximum number of times access is allowed in a set period of time, a maximum number of concurrent devices allowed to access a Web site by either a company or a facility, trigger(s) for event(s) such as sending an email, a Web address (e.g. a uniform resource locator) of the first Web page 62 to which an authorized device that satisfies its associated rules is forwarded, and a Web address (e.g. uniform resource locator) of a third Web page 104 to which an authorized device that does not satisfy at least one associated rule is forwarded. Examples of the trigger includes a trigger to page a Web site administrator or a Web site security officer if a number of unauthorized attempts have been made using the device.

As indicated by block 110, the Web shield computer 72 determines if access is authorized based on one or more rules in the rule record 100. If at least one of the rules is not satisfied such that access is unauthorized, the Web shield computer 72 denies and inhibits access to the first Web page 62 as indicated by block 112. Optionally, as indicated by block 114, the Web shield computer 72 forwards a user of an authorized device but whose access is unauthorized based on a rule to the third Web page 104. The third Web page 104 may tell the user that his/her attempt has been denied, and may tell of which rule or rules caused the attempt to be denied. In the case of the first Web page 62 providing a login user interface, the third Web page 104 may be absent of any login user interface.

If access is authorized based on the rule or rules in the rule record 100, the Web shield computer 72 enables access to the first Web page 62 as indicated by block 120. In the case of the first Web page 62 providing a login user interface, the user 16 can enter login information (e.g. a user name and/or password) into the login user interface (block 122). Based on an entry of valid login information by the user 16, the user 16 is given access to an application server 124 as indicated by block 126. The application server 124 may be located behind a firewall 130. For a telecommunications company, the application server 124 may be used by the user 16 to request a move, to add or change a telecommunication service, and/or to make a service request. The telecommunications company can process the received request to act to move, add or change the telecommunication service and to act on the service request.

Flow of the method is directed back to block 60 to process a subsequent attempt by the user 16 to access the first Web page 62.

Thus, using the Web shield acts to protect the application server 124 from hackers who have stolen passwords but do not have the identification device 14 or the computer 44, and terminated employees whose account has not been revoked but whose identification device 14 and/or computer 44 has been returned.

The herein-disclosed computers are illustrated to communicate via the Internet 132, although alternative computer networks are within the scope of this disclosure.

It is noted that the Web pages 62, 94 and 104 may be all part of the same Web site, or each may be from a different corresponding Web site. Similarly, the Web pages 62, 94 and 104 may be provided by the same Web server, or each may be provided by different corresponding Web servers. In one embodiment, the first Web page 62 is provided by a different Web server than one or more Web servers that provide the second Web page 94 and the third Web page 104.

It is also noted that other types of Web resources may be used in place of the first Web page 62, the second Web page 94 and the third Web page 104, which are particular embodiments of Web resources.

The herein-disclosed components and acts can be implemented using a computer system comprising one or more computers. The computer system may be directed by computer-readable program code stored by a computer-readable medium to provide the components and to perform the acts. The computer system may store the herein-disclosed data on a computer-readable medium. For example, the Web shield computer 72 can be directed by computer-readable program code stored by a computer-readable medium to perform its herein-disclosed acts.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
providing a computer-readable device to a user, the computer-readable device attachable to a personal item of the user, the computer-readable device having unique and unalterable device identification data set by a manufacturer, and application data stored therein by a party other than the manufacturer;
collecting the device identification data and the application data from the computer-readable device responsive to the user attempting to access a first Web resource;
determining if the computer-readable device is authorized based on the device identification data and the application data;
if the computer-readable device is unauthorized, denying access to the first Web resource and forwarding the user to a second Web resource which differs from the first Web resource; and
if the computer-readable device is authorized:
determining if access is authorized based on a rule record associated with the computer-readable device, wherein the rule record comprises a rule of a maximum number of times that after-hours access associated with the computer-readable device is allowed;
if access is authorized based on the rule record, enabling access by the user to the first Web resource; and
if access is unauthorized based on the rule record, denying access to the first Web resource and forwarding the user to a third Web resource which differs from the first and second Web resources.

2. The method of claim 1 wherein the party is connected with providing security for the first Web resource.

3. The method of claim 1 wherein the attempt by the user to access the first Web resource comprises receiving a uniform resource locator (URL) request associated with the first Web resource.

4. The method of claim 3 wherein the second Web resource does not include a login user interface.

5. The method of claim 3 wherein the third Web resource does not include a login user interface.

6. The method of claim 3 further comprising:
receiving login information entered into a login user interface by the user; and
based on the login information being valid, enabling access to an application server.

7. The method of claim 6 further comprising:
receiving by the application server a request by the user for a move, add or change in a telecommunication service; and
processing the request by a telecommunications company.

8. The method of claim 1 wherein the rule record further comprises a rule of a maximum number of concurrent devices allowed to access a Web site by either a company or a facility.

9. A system comprising:
a computer-readable device assigned to a user, the computer-readable device attachable to a personal item of the user, the computer-readable device having unique and unalterable device identification data set by a manufacturer, the computer-readable device having application data stored therein by a party other than the manufacturer; and
a Web shield computer programmed to:
collect the device identification data and the application data from the computer-readable device in response to the user attempting to access a first Web resource;
determine if the computer-readable device is authorized based on the device identification data and the application data;
if the computer-readable device is unauthorized, deny access to the first Web resource and forward the user to a second Web resource which differs from the first Web resource; and
if the computer-readable device is authorized:
determine if access is authorized based on a rule record associated with the computer-readable device, wherein the rule record comprises a rule of a maximum number of times that after-hours access associated with the computer-readable device is allowed;
if access is authorized based on the rule record, enable access by the user to the first Web resource; and
if access is unauthorized based on the rule record, deny access to the first Web resource and forwarding the user to a third Web resource which differs from the first and second Web resources.

10. A method comprising:
sending an email requesting that a computer program be run on a computer to register the computer for subsequent access of a first Web resource, the email having a unique identifier and usable at most once to register the computer;
collecting a media access control (MAC) address of the computer in response to the computer program;
storing application data to the computer in response to the computer program;
receiving an attempt to access a first Web resource using the computer;
collecting the MAC address and the application data from the computer based on the attempt;
determining if the computer is authorized based on the MAC address and the application data;
if the computer is unauthorized, denying access to the first Web resource and forwarding the computer to a second Web resource which differs from the first Web resource; and
if the computer is authorized:
determining if access is authorized based on a rule record associated with the computer, wherein the rule record comprises a rule of a maximum number of times that after-hours access associated with a computer-readable device is allowed;

if access is authorized based on the rule record, enabling access by the computer to the first Web resource; and if access is unauthorized based on the rule record, denying access to the first Web resource and forwarding the computer to a third Web resource which differs from the first and second Web resources.

11. The method of claim 10 wherein the application data is stored in a registry of the computer.

12. The method of claim 10 wherein the first Web resource provides a login user interface.

13. The method of claim 12 wherein the second Web resource does not includes a login user interface.

14. The method of claim 12 wherein the third Web resource does not include a login user interface.

15. The method of claim 12 further comprising:
receiving login information entered into the login user interface using the computer; and
based on the login information being valid, enabling access by the computer to an application server.

16. The method of claim 15 further comprising:
receiving by the application server a request from the computer for a move, add or change in a telecommunication service; and
processing the request by a telecommunications company.

17. The method of claim 10 wherein the rule record further comprises a rule of a maximum number of concurrent devices allowed to access a Web site by either a company or a facility.

* * * * *